United States Patent

Frith et al.

[11] Patent Number: 5,943,426
[45] Date of Patent: Aug. 24, 1999

[54] METHOD AND APPARATUS FOR RELAYING DIGITALLY SIGNED MESSAGES

[75] Inventors: Robert David Frith, Scottsdale, Ariz.; Larry Charles Puhl, Sleepy Hollow; Ezzat A. Dabbish, Cary, both of Ill.

[73] Assignee: Motorola, Inc., Schaumburg, Ill.

[21] Appl. No.: 08/934,691

[22] Filed: Sep. 22, 1997

Related U.S. Application Data

[63] Continuation of application No. 08/533,040, Sep. 25, 1995.
[51] Int. Cl.[6] ........................................ H04L 9/00
[52] U.S. Cl. ............................................... 380/25
[58] Field of Search .................. 380/23, 25, 49

[56] References Cited

U.S. PATENT DOCUMENTS

| | | | |
|---|---|---|---|
| 4,885,777 | 12/1989 | Takaragi et al. | 380/30 |
| 5,218,637 | 6/1993 | Angebaud et al. | 380/23 |
| 5,452,356 | 9/1995 | Albert | 380/9 |
| 5,465,299 | 11/1995 | Matsumoto et al. | 380/23 |

*Primary Examiner*—Gail O. Hayes
*Assistant Examiner*—Carmen D. White
*Attorney, Agent, or Firm*—Bradley J. Botsch

[57] ABSTRACT

A communication network (10) includes any number of interconnected nodes (20), including a sending node (22), a sending gateway (24), a receiving gateway (26), and a destination node (28). A low capacity or expensive communication channel (30) resides between the sending and receiving gateways (24, 26). An original digitally signed message is sent from the sending node (22) toward the destination node (28). When the original message arrives at the sending gateway (24), the original signature is verified. If verified, the sending gateway (24) shrinks the original message into a reduced message and re-signs the message with a gateway digital signature before sending the message onward through the communication channel (30) toward the destination node (28). The destination node (28) verifies the gateway digital signature against the reduced message and is not required to de-compress the reduced message into a precise duplicate of the original message.

14 Claims, 4 Drawing Sheets

METHOD AND APPARATUS FOR RELAYING DIGITALLY SIGNED MESSAGES

This application is a continuation of prior application Ser. No. 08/533,040 filed Sep. 25, 1995.

FIELD OF THE INVENTION

The present invention relates to the transmission of electronic messages having digital signatures attached thereto.

BACKGROUND OF THE INVENTION

Computer and other data processing devices are often interconnected through communication networks, such as RF communication links, public and private telecommunication networks, and local and wide area networks. This connectivity allows the devices to engage in electronic data communication. Even though electronic data communication is a ubiquitous fact of modern life, different types of data communications pose different problems. For example, the electronic communication of a large quantity of data may so sufficiently tax the resources of a communication network that the cost of the communication exceeds its value. In another example, the electronic communication of certain sensitive data, such as financial transaction data, may accomplish little unless the sending and receiving parties can be assured that accurate and authentic data are communicated.

Data compression provides a solution to the problem of communicating a large quantity of data. A large quantity of data may be compressed by removing redundant or unnecessary information before transmission, then the compressed data are transmitted through the network and expanded after receipt. With "loss-less" compression, hereinafter referred to simply as compression, the received data may be expanded to precisely the same data that were compressed. With "lossy" compression, hereinafter referred to as reduction, the general informational content of a communication can be reconstructed after receipt, but the reconstructed data typically are not precisely the same as the original data.

Compression standards such as Microcom Network Protocol (MNP) service classes 5 and 7 and V.42 bis achieve average compression ratios from 2:1 to 3.5:1 for typical data communications. Reduction techniques rely upon the application of intelligence concerning the type of data being reduced to extract important information and exclude unimportant information. Reduction techniques may achieve much higher compression ratios than can be achieved through compression. Thus, data reduction is a highly desirable solution to the problem of communicating large quantities of data.

Digital signatures provide a solution to the problem of communicating sensitive data. Traditionally, digital signature schemes use a hashing function to determine a checksum or other characteristic number that is extremely unlikely to be duplicated by "hashing" a different message. This characteristic number is encrypted using a sender's private encryption key to form a digital signature. The digital signature is then attached to the message for communication to a destination. At the destination, the sender's public key is used to decrypt the signature, and the message is again hashed to re-generate a characteristic number. The re-generated characteristic number should correspond to the results obtained from decrypting the digital signature. Various digital signature schemes are known, including RSA and Digital Signature Standard (DSS). These schemes generally provide assurances that the received message is accurate and that the sending party is authentic.

While data reduction is a highly desirable solution to communicating a relatively large quantity of data, this solution is incompatible with the communication of digital signatures. Since data reduction techniques do not precisely reconstruct a communicated message, a digital signature computed over an original message does not verify against the reconstructed message. Accordingly, a need exists for a method and apparatus that relays digital messages within a communication network and is consistent with both data reduction techniques and digital signature schemes.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
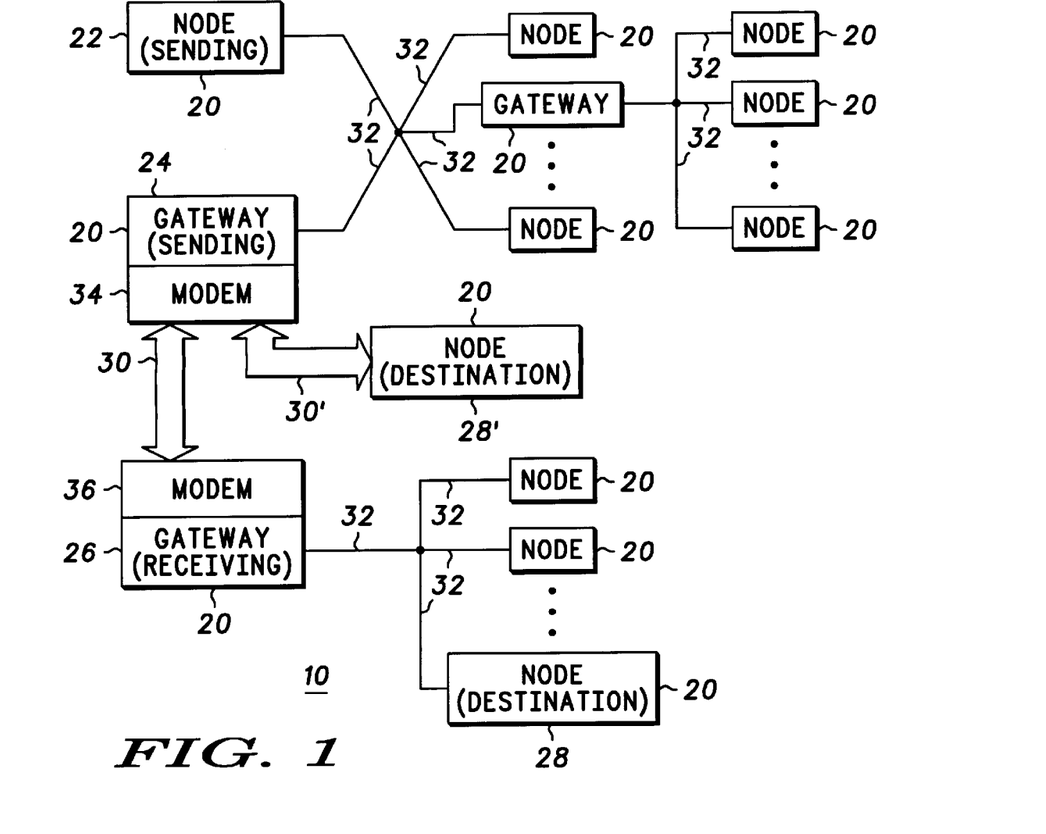
FIG. 1 shows a block diagram of a communication network within which the preferred embodiments of the present invention may be practiced.

FIG. 1 shows a block diagram of a communication network 10. Network 10 includes a plurality of network nodes 20. Nodes 20 may be configured as any type of telecommunication or data processing device, such as radios, personal digital assistants, personal computers, mainframe computers, workstations, gateways, routers, bridges, and the like. Digital messages may be communicated between any two or more of nodes 20. Such communication may route messages through various intermediate nodes 20, such as a gateway node.

For purposes of the description presented below, a sending node 22 is the node 20 of network 10 where a message originates. This original message may have a digital signature attached thereto and be directed to a particular destination. A sending gateway 24 represents a first intermediate node 20 of network 10, a receiving gateway 26 represents a second intermediate node 20 of network 10, and destination nodes 28 or 28' represent alternative termination points for the original message. Any mention of a destination node 28 below refers to either of destination nodes 28 or 28' singularly or both collectively. Of course, those skilled in the art will appreciate that messages originating at sending node 22 may be routed to and through other nodes 20 of network 10 and that any node 20 of network 10 may originate a message.

Sending gateway 24 gives the message access to a communication channel 30, or in an alternative embodiment to a communication channel 30'. Gateway 24 need not simultaneously support both of channels 30 and 30'. Any mention of a communication channel 30 below refers to either of channels 30 or 30' singularly or both collectively.

While the present invention may be useful in a wide variety of situations and circumstances, it may be particularly useful when channel 30 is a scarce communication resource. For example, channel 30 may cross international borders where tariffs are imposed. Consequently, transmitting a message across channel 30 may be more expensive than transmitting the message across other links 32 which interconnect nodes 20. Or, channel 30 may be an RF or other link which has limited capacity, particularly when compared to the data transfer rates supported by other links 32 of network 10. In these and other situations, the sending party, the destination party, and/or the provider of channel 30 are motivated to keep the messages passing through channel 30 as short as possible. This motivation may not be present for messages routed exclusively through other links 32 of network 10 and which avoid channel 30.

In the preferred embodiments of the present invention, sending gateway 24 performs data reduction. As discussed above, data reduction differs from data compression. Generally, data reduction achieves a greater compression ratio than data compression, but reconstructed data are typically not precisely the same as original data. Thus, sending gateway 24 reduces an original message from sending node 22 into a reduced message, and this reduced message is then transmitted through communication channel 30.

In addition to data reduction, gateway 24 may but is not required to perform compression. For example, a modem 34 of gateway 24 may implement a data compression scheme, such as MNP, V.42 bis, or others known to those skilled in the art. Modem 34 may compress the reduced message to generate a compressed and reduced message. When a compressed and reduced message transmitted through channel 30 is received at receiving gateway 26 or directly at destination node 28' (may implicitly contain a modem), a de-compression operation de-compresses the compressed and reduced message. Thus, the reduced message is generated from the de-compression operation. The de-compression operation may be performed at a modem 36 of receiving gateway 26 or directly within destination node 28'.

In the embodiment of the present invention where the reduced message is received at receiving gateway 26 rather than directly at destination node 28', receiving gateway 26 performs an expansion operation to reconstruct or restate the original message. As discussed above, this expansion operation need not precisely duplicate the data content of the original message. However, the reduction and expansion operations desirably operate together to communicate the basic informational content of the message. At receiving gateway 26, this restated message is transmitted through other links 32 toward destination node 28. In the embodiment of the present invention where the reduced message is received directly at destination node 28', destination node 28' may perform an expansion operation to reconstruct or restate the original message.

Figure 2:
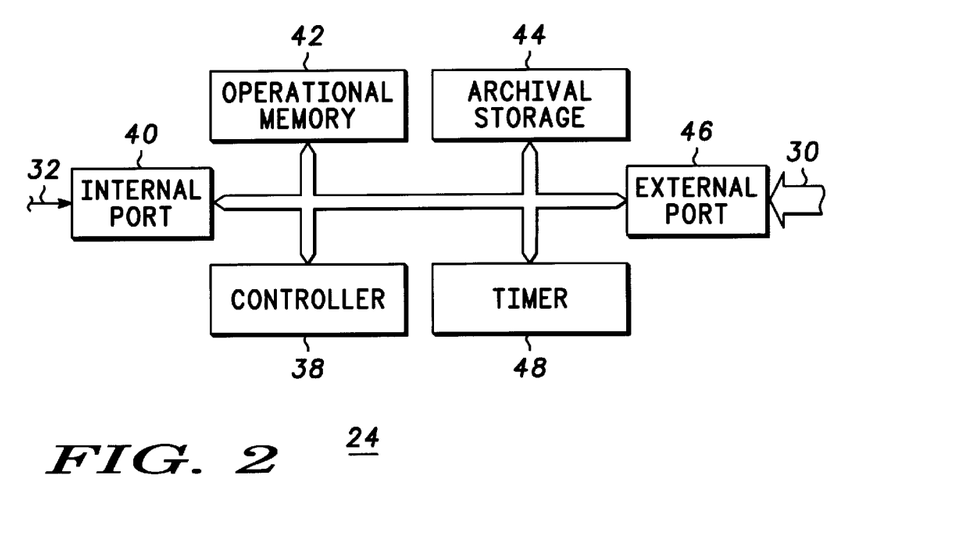
FIG. 2 shows a block diagram of a gateway which relays digitally signed messages.

FIG. 2 shows a block diagram of sending gateway 24. Gateway 24 includes a controller 38 which couples to an internal port 40, an operational memory 42, an archival storage 44, an external port 46, and a timer 48. Controller 38 may be implemented using a conventional microprocessor so that it operates in accordance with programming instructions stored in operational memory 42. These programming instructions are described below in connection with FIGS. 3–7. While FIG. 2 depicts one embodiment, those skilled in the art will appreciate that variations on this structure may also be used. For example, controller 38 may be implemented using multiple microprocessors, each of which performs specific tasks.

An original message which includes an original digital signature is received at internal port 40 of node 24. Internal port 40 couples to a link 32 of network 10. Under the control of controller 38, the original message is transferred to an appropriate buffer storage location in operational memory 42. Controller 38 processes the original message to verify the original digital signature and to generate a new gateway digital signature which is unique to node 24. Timer 48 helps controller 38 track the passage of time, and timing information from timer 48 may be used in verifying original digital signatures and in generating gateway digital signatures. Desirably, controller 38 also processes the original message into a reduced message. Node 24 uses archival storage 44 to store copies of digitally signed messages received at and sent from node 24. Reduced messages are transmitted away from node 24 under the control of controller 38 through external port 46. External port 46 couples to communication channel 30. As discussed above, in one embodiment a modem (not shown) may be included to compress the reduced message, among other things. Of course, controller 38 may alternatively be configured to compress the reduced message.

While FIG. 2 specifically depicts sending gateway 24, similar structures are employed at other nodes of network 10. For example, receiving gateway 26 (see FIG. 1) has a similar structure, except that a reduced message is received at external port 46, the reduced message is expanded into a restated message, and this restated message is transmitted at internal port 40. Sending node 22 (see FIG. 1) has a similar structure, except that no external port is included, and sending node 22 generates the original digital signature without necessarily verifying another digital signature. Destination node 28 (see FIG. 1) has a similar structure, except that no external port is included, and destination node 28 verifies digital signatures without necessarily generating other digital signatures. Destination node 28' (see FIG. 1) has a similar structure, except that no internal port is included, and destination node 28' verifies digital signatures without necessarily generating other digital signatures.

Figure 3:
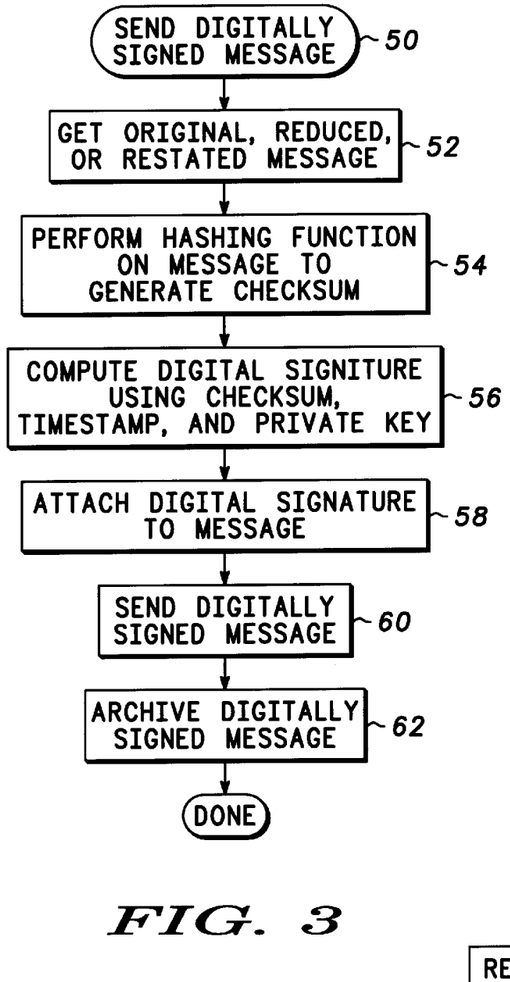
FIG. 3 shows a flow chart of a "send digitally signed message" procedure performed by various nodes within the network.

FIG. 3 shows a flow chart of a "send digitally signed message" procedure 50 performed by various nodes 20 (see FIG. 1) within network 10. In particular, procedure 50 may be performed by a sending node 22, a sending gateway 24, or a receiving gateway 26. Procedure 50 is performed in response to programming instructions stored in operational memory 42. Generally, procedure 50 causes a message to have a digital signature attached thereto and to be sent from the node 20 onward toward the message's destination.

Procedure 50 performs a task 52 to get or otherwise identify a message for which a digital signature is to be generated. When task 52 is performed by sending node 22 (see FIG. 1), the message is an original message. Thus, task 52 may be performed when a user at node 22 requests that a digitally signed original message be sent to destination node 28 (see FIG. 1). When task 52 is performed by sending gateway 24 (see FIG. 1), the message is a reduced message. When task 52 is performed by receiving gateway 26 (see FIG. 1), the message is a restated message. Thus, task 52 may be performed automatically by processes (discussed below) which have verified an original or gateway digital signature and have decided to relay a reduced or expanded form of the message toward the message's destination with a fresh digital signature.

After task 52, a task 54 performs a hashing function on the message to generate a checksum or other characteristic number. Task 54 performs a conventional hashing operation to generate a number which typically has substantially fewer bits than are included in the message, but which has a value that summarizes the entirety of the message. Desirably, task 54 uses a hashing function which is extremely unlikely to generate the same checksum or characteristic number in response to different messages.

Next, a task 56 computes a digital signature. The digital signature is an encrypted form of the checksum or other characteristic number determined above in task 54 and possibly other information. Task 56 may follow conventional digital signature schemes which use this checksum along with a time stamp and a private key. The private key used in task 56 is desirably unique to the node 20 performing procedure 50. Thus, sending node 22, sending gateway 24, and receiving gateway 26 all have different private keys. Moreover, the private key used at task 56 is desirably unknown at other nodes in network 10, except for a certifying agency (not shown) that generates and guarantees the trustworthiness of corresponding private and public keys for various nodes in network 10.

After a digital signature has been computed, a task 58 makes a digitally signed message by attaching the digital signature to the message, whether that message is an original message, reduced message, or restated message. Next, a task 60 sends the digitally signed message toward the message's destination through network 10. Sending node 22 need not be concerned with whether the message will pass through communication channel 30 (see FIG. 1). When task 60 is performed by sending node 22 or receiving gateway 26, the message is sent through a network communication link 32. When task 60 is performed by sending gateway 24, the message is sent through communication channel 30.

After task 60, a task 62 archives the digitally signed message. Task 62 typically archives the digitally signed message at the node 22, 24, or 26 from which the message is sent. However, this is not a requirement. The digitally signed message may be archived through any node of network 10 which is beyond the control of downstream nodes in network 10. Downstream nodes are identified from the perspective of the transmitting node 22, 24, or 26. Destination node 28 is always downstream from the transmitting node, and sending node 22 is never downstream from the transmitting node. Archiving is a desirable process because the archive copy may be useful later should the sending party have reason to question whether a message received at the destination was accurate.

Task 62 completes procedure 50. With respect to sending node 22, procedure 50 causes an original digitally signed message to be sent toward destination node 28. Sending and receiving gateways 24 and 26, respectively, may perform procedure 50 to relay the message. However, sending gateway 24 sends a reduced digitally signed message rather than the original message, and receiving gateway 26 sends a restated digitally signed message rather than the original or reduced messages.

Figure 4:
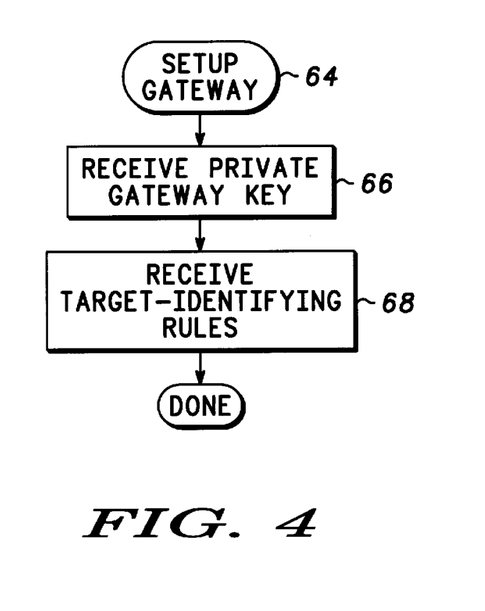
FIG. 4 shows a flow chart of a "setup gateway" procedure performed by the gateway.

FIG. 4 shows a flow chart of a "setup gateway" procedure 64 performed by sending and receiving gateways 24 and 26, respectively. Procedure 64 is performed in response to programming instructions stored in operational memory 42. Generally, procedure 64 is performed to obtain data which are useful in other procedures, discussed below.

Procedure 64 performs a task 66 to receive a private gateway key. Desirably, this private key is uniquely designed for the gateway 24 or 26 which receives it, and the key is desirably received from a key certifying agency. Desirably, steps are taken at gateways 24 and 26 to insure the security of the private key so that the private key remains unknown outside the gateway 24 or 26 to which it is assigned and the certifying agency. The private key received during task 66 is used in task 56 (see FIG. 3) to generate a digital signature which is unique to the receiving gateway 24 or 26.

In addition, procedure 64 performs a task 68 to receive target-identifying rules. For a sending gateway 24, such rules allow the gateway to identify target information which will be sent onward. Non-target information will be filtered out to reduce the amount of data transmitted over channel 30. These rules may be generated by or with the help of the users of sending and destination nodes 22 and 28, respectively. For a receiving gateway 26, such rules allow the gateway 26 to expand the target information into a restatement of the original data.

As an example of target-identifying rules, a message may represent a bit-mapped graphics file which depicts a form letter having a large amount of boiler-plate information and a small amount of new information. The new information may be specified as target information and the boiler-plate as non-target information. In another example, voice data may be reduced using linear predictive coding techniques which identify target information in a voice signal. In another example, an alphanumeric message may be processed to identify and exclude articles, adverbs, and commas embedded in numbers. In yet another example, messages may be relatively short in length, with digital signatures being a significant portion of the digitally signed messages, particularly when digital signatures are used to communicate a string of acknowledgments of received messages, and acknowledgements of received acknowledgements. Target-identifying rules may be established so that the message is target information but prior digital signatures are non-target information. Thus, target-identifying rules may be established to allow original and other digital signatures to be excluded or to pass onward toward destination node 28.

While FIG. 4 indicates that setup process 64 is complete after tasks 66 and 68, those skilled in the art will appreciate that any number of additional tasks which are well known in the art of data communication devices or which are not important to the present invention may also be performed.

Figure 5:
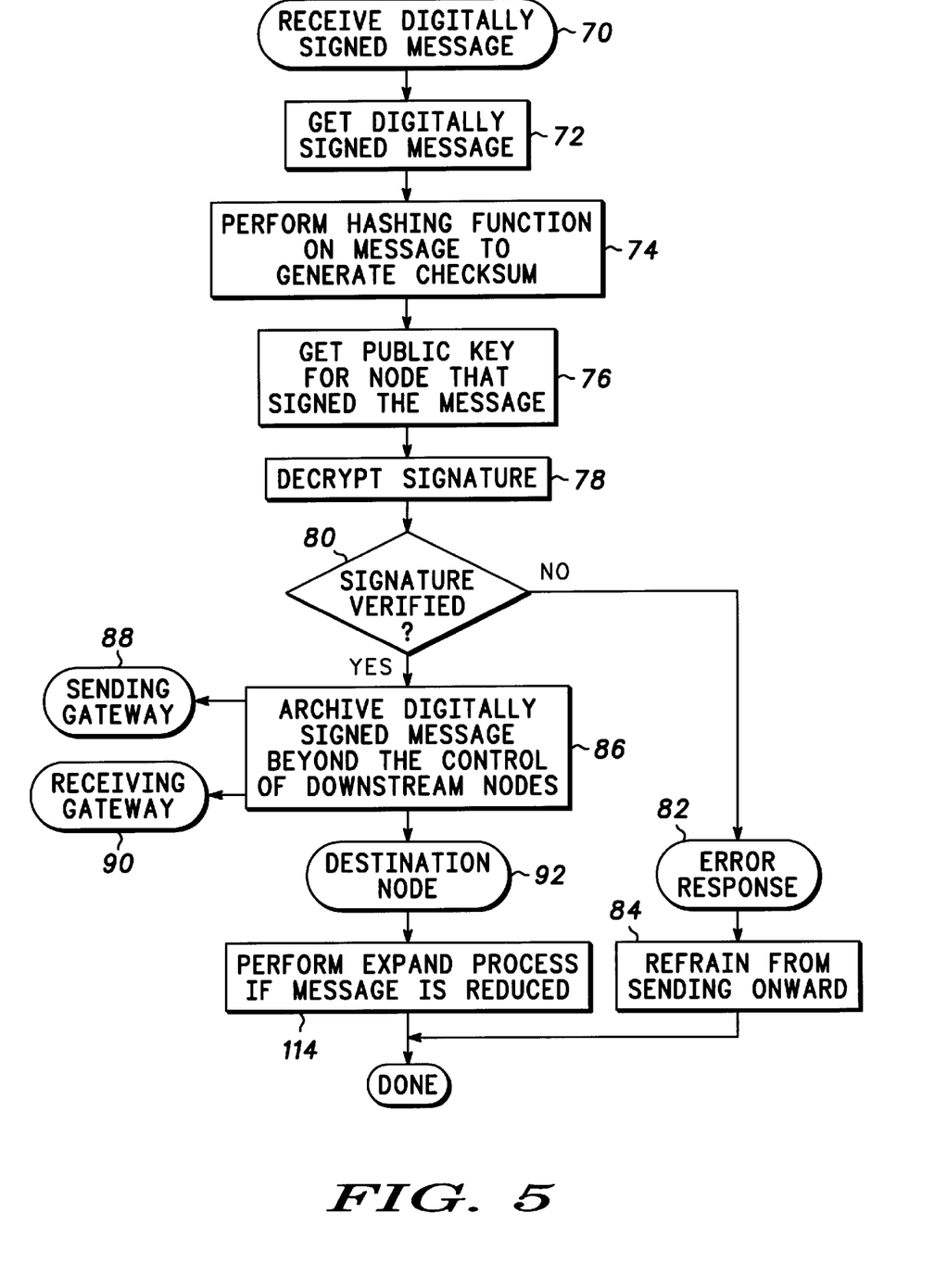
FIG. 5 shows a flow chart of a "receive digitally signed message" procedure performed by various nodes within the network.

FIG. 5 shows a flow chart of a "receive digitally signed message" procedure 70 performed by various nodes 20 within network 10. In particular, procedure 70 may be performed by a sending gateway 24, a receiving gateway 26, or a destination node 28. Procedure 70 is performed in response to programming instructions stored in operational memory 42. Generally, procedure 70 causes a received message having a digital signature attached thereto to be processed.

Procedure 70 performs a task 72 to get or otherwise identify a digitally signed message which has been received at the node 20 performing procedure 70. When task 72 is performed by sending gateway 24, the message is an original message. When task 72 is performed by receiving gateway 26, the message is a reduced message. When task 72 is performed by destination node 28, the message is a restated message.

After task 72, a task 74 performs a hashing function on the message to generate a checksum or other characteristic number. Desirably, task 74 performs the same hashing function as was performed by an upstream node 20 during task 54 (see FIG. 3) of the sending procedure 50. Thus, task 74 should re-generate the same checksum or other characteristic number that was generated prior to forming the message's digital signature. However, if the data content of the message has changed, this checksum or other characteristic number will differ.

Next, a task 76 gets a public key for the node 20 that digitally signed the message. For an original digitally signed message received at sending gateway 24, task 76 gets a public key for sending node 22. For a reduced digitally signed message received at receiving gateway 26 or at a destination node 28', task 76 gets a public key for sending gateway 24. For a restated digitally signed message received at destination node 28, task 76 gets a public key for receiving gateway 26. The public key may be obtained from a public key database located at the receiving node 20 or available to node 20 through network 10. After task 76, a task 78 uses the public key to decrypt the received message's digital signature. Conventional digital signature techniques may be used in task 78.

After task 78, a query task 80 determines whether the digital signature verifies against the received message. For example, the decrypted digital signature from task 78 is compared with the checksum or other characteristic number determined above in task 74. If the decrypted characteristic number and the newly hashed characteristic number do not match, then the signature does not verify. In addition, task 80 may but need not employ other discriminants to verify the signature. For example, a time stamp included in the decrypted digital signature may be compared against the current time. If the time stamp indicates a stale signature, then the signature does not verify.

If task 80 determines that the signature does not verify, then procedure 70 performs an error response process 82. Error response process 82 may include any manner of reporting and logging activities with respect to the not verified signature. In addition, error process 82 includes a task 84 which refrains from sending the message onward toward destination node 28 through network 10. Thus, when task 82 is performed at sending gateway 24, the limited or expensive resource of communication channel 30 is not consumed when the signature cannot be verified. of course, those skilled in the art will appreciate that task 84 may actually be performed by doing nothing, and that task 84 accomplishes little if performed at destination node 28. Error response process 82, including task 84, completes procedure 70 when a signature is not verified.

When task 80 verifies a digital signature attached to a message, a task 86 archives the digitally signed message beyond the control of downstream nodes 20. Task 86 allows the receiving node 24, 26, or 28 to later prove that the received message, whether an original message, reduced message, or restated message, appeared to be authentic and accurate.

After task 86, procedure 70 performs different processes depending upon which node 24, 26, or 28 is performing procedure 70. A sending gateway 24 performs a sending gateway process 88, a receiving gateway 26 performs a receiving gateway process 90, and a destination node 28 performs a destination node process 92.

Figure 6:
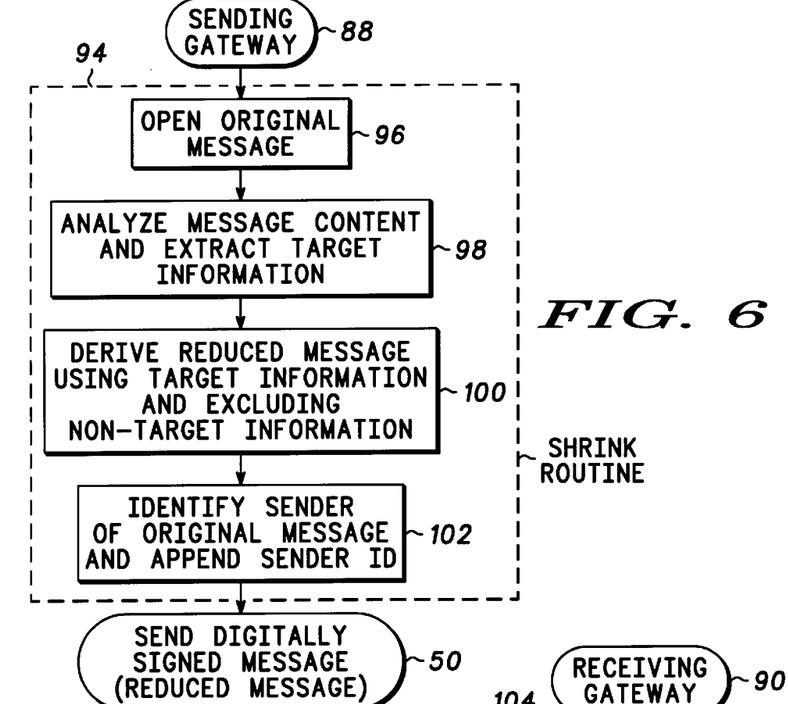
FIG. 6 shows a flow chart of a "sending gateway" process performed by various nodes within the network.

FIG. 6 shows a flow chart of sending gateway process 88 performed by sending gateway 24. Process 88 is performed in response to programming instructions stored in operational memory 42 of sending gateway 24. Generally, when a signature of an original digitally signed message is verified, process 88 causes a sending gateway 24 to shrink the original message into a reduced message, and then the reduced message is sent onward with a digital signature computed for sending gateway 24 rather than sending node 22.

Process 88 includes a shrink routine 94. Shrink routine 94 includes a task 96 which opens or otherwise accesses the original message. Next, a task 98 analyzes the original message in accordance with the target-identifying rules received during setup gateway procedure 64 (see FIG. 4). In particular, task 98 analyzes the informational content of the message to identify and extract target information from the original message.

After task 98, a task 100 derives a reduced message from the original message. The reduced message includes the target information from the original message but desirably excludes non-target information which may have been included in the original message. Target-identifying rules are desirably established so that the reduced message includes only a portion of the original message so that communication channel 30 will be used more efficiently. Next, a task 102 identifies the sender of the original message and appends a sender ID to the message. The sender of the message may be identified from the database (see task 76, FIG. 5) that provided a public key which lead to signature verification. Task 102 completes shrink routine 94.

After shrink routine 94, sending gateway process 88 performs procedure 50, discussed above in connection with FIG. 3. Procedure 50 computes a digital signature for the reduced message produced by shrink routine 94. The digital signature is computed over the reduced message rather than the original message, and the digital signature is computed using the sending gateway's private key. Thus, procedure 50 generates a gateway digital signature. The original digital signature attached to the original message may be excluded from or included in the reduced message, as set forth in target-identifying rules. Accordingly, sending gateway 24 "re-signs" the message in its reduced form. Security, authenticity, and accuracy assurances provided through public key encryption and the original digital signature are maintained through the use of a private key assigned to sending gateway 24.

Figure 7:
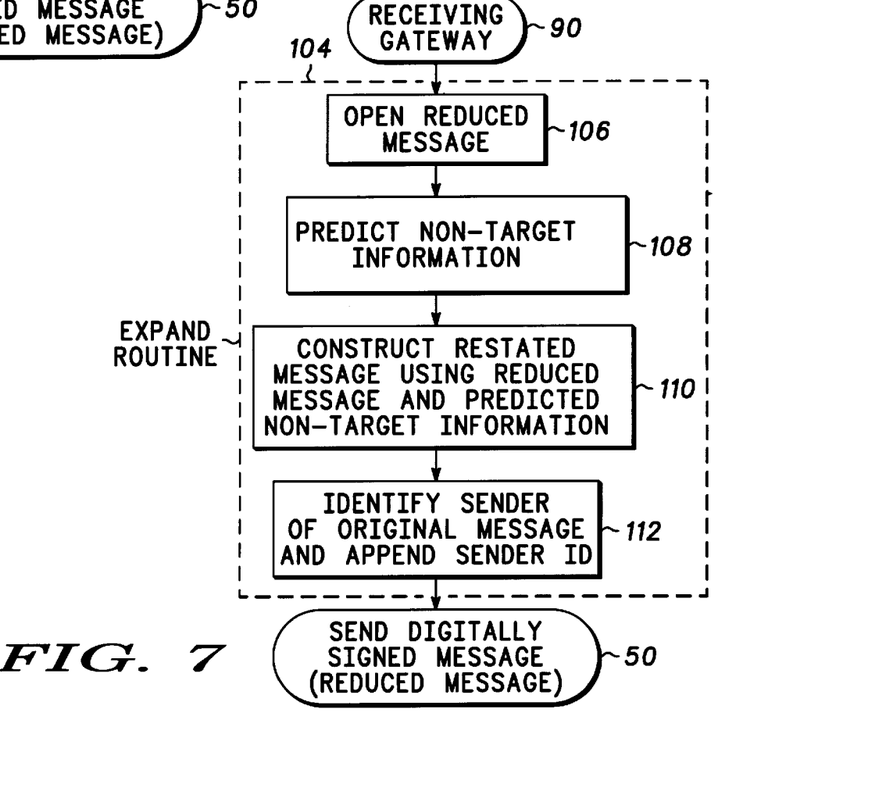
FIG. 7 shows a flow chart of a "receiving gateway" process performed by various nodes within the network.

FIG. 7 shows a flow chart of receiving gateway process 90 performed by receiving gateway 26. Process 90 is performed in response to programming instructions stored in operational memory 42 of receiving gateway 26. Generally, when a signature of a reduced digitally signed message is verified, process 90 causes receiving gateway 26 to expand the reduced message into a restated message, and then the restated message is sent onward with a digital signature computed for receiving gateway 26 rather than sending node 22 or sending gateway 24.

Process 90 includes an expand routine 104. Expand routine 104 includes a task 106 which opens or otherwise accesses the reduced message. Next, a task 108 predicts various items of non-target information that may have been excluded from the reduced message. Predictions may be based upon target-identifying rules received during setup procedure 64 (see FIG. 4). Those skilled in the art will appreciate that task 108 need not make a perfect prediction regarding non-target information. Rather, when target-identifying rules used in deriving a reduced message make prediction possible, better results are obtained from better predictions. However, in some situations predictions may be so unreliable that better results are obtained by omitting task 108 altogether.

After task 108, a task 110 constructs the restated message using the reduced message and any predictions regarding non-target information. Next, a task 112 identifies the sender of the reduced message (i.e. sending gateway 24) and appends a sender ID. The sending gateway's identity may be determined from the public key database that provided a public key which led to a verified signature for the reduced message. Information included in the reduced message identifying the original message sender (i.e. sending node 22) is retained in the restated message. Task 112 completes expand routine 104.

After expand routine 104, receiving gateway process 90 performs procedure 50, discussed above in connection with FIG. 3. Procedure 50 computes a digital signature for the restated message produced by expand routine 104. The digital signature is computed over the restated message rather than the original message or reduced message, and the digital signature is computed using the receiving gateway's private key. Thus, procedure 50 generates a second gateway digital signature. Accordingly, receiving gateway 26 "re-signs" the message in its restated form. Security, authenticity, and accuracy assurances provided through prior digital signatures are maintained and extended through the use of the private key assigned to receiving gateway 26.

Referring back to FIG. 5, destination node process 92 is performed when a signature is verified at a destination node 28' for a reduced digitally signed message or when a signature is verified at a destination node 28 for a restated digitally signed message. If the message is restated rather than reduced, destination node process 92 need not take further action. The original message has been restated as accurately as possible and the digital signature verifies. If the message is reduced rather than restated, then destination node process 92 may perform a task 114. Task 114 performs expand process 104 (see FIG. 7) to derive a restated message from the reduced message.

At this point, the message has been delivered to its destination through channel 30 and the original digital signature has been verified. original signature verification occurred at sending gateway 24. A string of sender identities identify nodes 20 that may have re-signed the message. The original, reduced, and restated messages have been archived so that an audit trail exists.

In summary, the present invention provides a new and improved method and apparatus for relaying digitally signed messages. The messages may be efficiently relayed through a low capacity or expensive communication channel. The messages may be reduced prior to being relayed through the communication channel. Digital signatures are verified at a sending gateway to the communication channel, and the assurances provided by a digital signature scheme are extended to reduced messages by having the sending gateway re-sign the message using a gateway digital signature computed using a private key for the sending gateway.

The present invention has been described above with reference to preferred embodiments. However, those skilled in the art will recognize that changes and modifications may be made in these preferred embodiments without departing from the scope of the present invention. For example, although shrinkage between original and reduced messages is a desirable goal, target-identifying rules need not cause any shrinkage between original and reduced messages. Likewise, any number of intermediate gateways may be included between sending and destination nodes to relay and re-sign the message. These and other changes and modifications which are obvious to those skilled in the art are intended to be included within the scope of the present invention.

What is claimed is:

1. A method of transferring a digitally signed message from a first gateway to a second gateway via a communication channel, said method comprising the steps of:

receiving an original message at said first gateway, said original message having an original digital signature associated therewith;

verifying an authenticity of said original digital signature with respect to said original message at said first gateway;

deriving, at the first gateway, target information from said original message based on predefined rules;

reducing, at the first gateway, said original message by replacing non-target information with said target information to create a reduced message, said target information having a lower information content than said non-target information;

determining a gateway digital signature for said reduced message thereby preserving an accurate and verifiable digital signature when transferred over the communication channel;

sending said reduced message and said gateway digital signature from said first gateway to said second gateway via said communication channel wherein said reduced message occupies less bandwidth than said original message;

predicting, at said second gateway, said non-target information based on said predefined rules and said target information, said predicted non-target information differing from said non-target information; and expanding said reduced message by replacing said target information with said predicted non-target information.

2. A method as claimed in claim 1 additionally comprising the step of compressing said reduced message so that said reduced message may be reconstructed after passing through said communication channel.

3. A method as claimed in claim 1 wherein:

said original message is directed to a destination node; and said method additionally comprises the step of archiving said reduced message and said gateway digital signature through a network node other than said destination node.

4. A method as claimed in claim 1 wherein:

said sending step is performed when said verifying step verifies said original digital signature; and said method additionally comprises the step of refraining from sending said message through said communication channel when said verifying step fails to verify said original digital signature.

5. A method as claimed in claim 1 wherein:

said original message is directed to a destination node; and said method additionally comprises the step of archiving said original digital signature and said original message through a network node other than said destination node.

6. A method as claimed in claim 1 additionally comprising the steps of:

receiving a private gateway key; and using said private gateway key in said determining step to determine said gateway digital signature.

7. A method as claimed in claim 1 additionally comprising the steps of:

identifying a sender of said original message; and appending a sender identity to at least a portion of said original message sent during said sending step.

8. A communication network for transferring a digitally signed message between gateways coupled via a communication channel, each of said gateways comprising:

a first port for receiving an original message having a destination reachable through said communication channel, said original message having an original digital signature associated therewith;

a controller coupled to said first port and configured to verify said original digital signature with respect to said original message, to derive target information from said original message based on predefined rules, to reduce said original message into a reduced message according to predefined rules by replacing non-target information with said target information to create said reduced message, said target information having a lower information content than said non-target information, and to determine a gateway digital signature for said reduced message thereby preserving an accurate and verifiable digital signature when transferred over said communication channel; and a second port coupled to said controller, said second port being configured to send said reduced message and said gateway digital signature to another gateway via said communication channel wherein said reduced message occupies less bandwidth than said original message and thereby allows the use of low capacity transmission networks.

9. The communication network gateway of claim 8 wherein said controller archives said reduced message and said gateway digital signature.

10. The communication network gateway of claim 8 wherein said second port sends said reduced message and said gateway digital signature through said communication channel only when said original digital signature is verified.

11. A method as claimed in claim 1, wherein said receiving step receives said original message over a second communication channel, and wherein in said sending step, said first gateway sends said reduced message over said communication channel, said communication channel has a lower capacity than said second communication channel.

12. A method of transferring a digitally signed voice message received at a first gateway via a first communication channel to a second gateway via a second communication channel, said first communication channel having greater bandwidth than said second communication channel, said method comprising the steps of:

receiving, via said first communication channel, a voice message at said first gateway, said voice message having an original digital signature associated therewith;

verifying an authenticity of said original digital signature;

deriving coefficients for said voice message based on coding techniques;

reducing said voice message by replacing an original voice signal portion of said voice message with said coefficients to create a reduced message;

determining a gateway digital signature for said reduced message;

sending said reduced message and said gateway digital signature from said first gateway to said second gateway via said second communication channel, said reduced message occupying less bandwidth than said voice message;

predicting, at said second gateway, said original voice signal portion based on said coding techniques and said coefficients, said predicted voice signal differing from said original voice signal portion; and expanding said reduced message by replacing said coefficients with said predicted voice signal.

13. A method of transferring a digitally signed page message from a first gateway via a first communication channel to a second gateway via a second communication channel, said first communication channel having greater bandwidth than said second communication channel, said method comprising the steps of:

receiving, via said first communication channel, a page message at said first gateway, said page message having an original digital signature associated therewith;

verifying an authenticity of said original digital signature;

deriving target information for said page message based on predefined rules;

reducing said page message by replacing non-target information with said target information to create a reduced message;

determining a gateway digital signature for said reduced message;

sending said reduced message and said gateway digital signature from said first gateway to said second gateway via said second communication channel, said reduced message occupying less bandwidth than said page message;

predicting, at said second gateway, said non-target information based on said predefined rules and target information, said predicted non-target information differing from said non-target information; and expanding said reduced message by replacing said target information with said predicted non-target information.

14. A communication network for transferring a digitally signed message from a first gateway to a second gateway coupled, said first gateway coupled to said second gateway via a communication channel, said second gateway comprising:

a first port for receiving said digitally signed message, said digitally signed message having a digital signature associated with said first gateway, said digitally signed message having a data portion representing target information;

a controller coupled to said first port and configured to verify said digital signature with respect to said digitally signed message, to predict non-target information based on predefined rules and said target information, to expand said digitally signed message by replacing said target information with said predicted non-target information; and a second port coupled to said controller, said second port being configured to send said predicted non-target information to a destination node.

* * * * *